(12) United States Patent
Croxford et al.

(10) Patent No.: US 11,699,064 B2
(45) Date of Patent: Jul. 11, 2023

(54) DATA PROCESSING USING A NEURAL NETWORK SYSTEM

(71) Applicants: Apical Limited, Cambridge (GB); Arm Limited, Cambridge (GB)

(72) Inventors: Daren Croxford, Swaffham Prior (GB); Roberto Lopez Mendez, Cambridge (GB)

(73) Assignee: Arm Limited, Cambridge (GB)

( * ) Notice: Subject to any disclaimer, the term of this patent is extended or adjusted under 35 U.S.C. 154(b) by 980 days.

(21) Appl. No.: 16/392,391

(22) Filed: Apr. 23, 2019

(65) Prior Publication Data

US 2020/0342285 A1   Oct. 29, 2020

(51) Int. Cl.
*G06N 3/04* (2023.01)
(52) U.S. Cl.
CPC ....................... *G06N 3/04* (2013.01)
(58) Field of Classification Search
CPC ........................................................ G06N 3/04
See application file for complete search history.

(56) References Cited

U.S. PATENT DOCUMENTS

| | | | | |
|---|---|---|---|---|
| 2017/0140259 A1* | 5/2017 | Bergstra | ................... | B25J 9/161 |
| 2018/0053087 A1* | 2/2018 | Fukuda | ................... | G06N 3/063 |
| 2018/0157972 A1* | 6/2018 | Hu | ........................... | G06N 3/00 |
| 2019/0147337 A1* | 5/2019 | Yang | ....................... | G06N 3/045 |
| | | | | 706/25 |
| 2020/0125953 A1* | 4/2020 | Yoo | ........................ | G06N 7/005 |
| 2020/0151465 A1* | 5/2020 | Levi | ..................... | G05D 1/0246 |
| 2020/0251119 A1* | 8/2020 | Yang | ................... | G10L 21/0208 |
| 2020/0301739 A1* | 9/2020 | Xu | ........................ | G06F 9/4881 |
| 2020/0401869 A1* | 12/2020 | Baker | ................... | G06N 20/20 |

OTHER PUBLICATIONS

He et. al., "Multi-Task Zipping via Layer-wise Neuron Sharing", Mar. 2019 (Year: 2019).*
Vukotic et. al. "Bidirectional Joint Representation Learning with Symmetrical Deep Neural Networks for Multimodal and Crossmodal Applications", May 2016 (Year: 2016).*
Chou et. al. "Unifying and Merging Well-trained Deep Neural Networks for Inference Stage", May 2018 (Year: 2018).*
(Continued)

*Primary Examiner* — Omar F Fernandez Rivas
*Assistant Examiner* — Selene A. Haedi
(74) *Attorney, Agent, or Firm* — EIP US LLP

(57) ABSTRACT

A neural network system executable on a processor. The neural network system, when executed on the processor, comprises a merged layer shareable between a first neural network and a second neural network. The merged layer is configured to receive input data from a prior layer of at least one of the first and second neural networks. The merged layer is configured to apply a superset of weights to the input data to generate intermediate feature data representative of at least one feature of the input data, the superset of weights being combined from a first set of weights associated with the first neural network and a second set of weights associated with the second neural network. The merged layer is also configured to output the intermediate feature data to at least one subsequent layer, the at least one subsequent layer serving the first and second neural networks.

20 Claims, 5 Drawing Sheets

(56) References Cited

OTHER PUBLICATIONS

Alwani et. al., "Fused-Layer CNN Accelerators", Oct. 2016 (Year: 2016).*
Liu et al., "Recurrent Neural Network for Text Classification with Multi-Task Learning", 2016 (Year: 2016).*
Hashimoto et al., "A Joint Many-Task Model: Growing a Neural Network for Multiple NLP Tasks", 2017 (Year: 2017).*
Zheng et al., "Joint Deep Modeling of Users and Items Using Reviews for Recommendation", 2017 (Year: 2017).*

* cited by examiner

DATA PROCESSING USING A NEURAL NETWORK SYSTEM

BACKGROUND OF THE INVENTION

Technical Field

The present disclosure relates to methods and apparatus for processing data with a neural network system.

Background

Processing sensor-originated data, such as image data or audio data, with a neural network system to detect characteristics of the data, e.g. features or objects in the image or audio, may be computationally intensive. It is therefore desirable to improve the computational efficiency of neural network systems and associated data processing methods.

SUMMARY

According to a first aspect of the present disclosure, there is provided a neural network system executable on a processor, the neural network system, when executed on the processor, comprising a merged layer shareable between a first neural network and a second neural network, wherein the merged layer is configured to:

receive input data from a prior layer of at least one of the first and second neural networks;

apply a superset of weights to the input data to generate intermediate feature data representative of at least one feature of the input data, the superset of weights being combined from a first set of weights associated with the first neural network and a second set of weights associated with the second neural network; and output the intermediate feature data to at least one subsequent layer, the at least one subsequent layer serving the first and second neural networks.

According to a second aspect of the present disclosure, there is provided a data processing method comprising:

receiving data in the form of sequential data frames;

performing data processing in processing cycles, wherein in a given processing cycle, data processing is performed using one or more neural networks in a selected data frame; and configuring a first processing cycle and a second processing cycle by:

executing a first neural network of the one or more neural networks in the first processing cycle; and executing the first neural network and a second neural network of the one or more neural networks together in the second processing cycle, wherein the first and second neural networks together form a neural network system in accordance with the first aspect, the first and second neural networks comprising the merged layer when executing the first and second neural networks.

According to a third aspect of the present disclosure, there is provided a method of processing data using a processor configured to execute a neural network system, the method comprising:

receiving input data at a merged layer, shared between a first neural network and a second neural network of the neural network system, from a prior layer of at least one of the first and second neural networks;

applying a superset of weights to the input data to generate intermediate feature data representative of at least one feature of the input data, the superset of weights being combined from a first set of weights associated with the first neural network and a second set of weights associated with the second neural network; and outputting the intermediate feature data to at least one subsequent layer, the at least one subsequent layer serving the first and second neural networks.

Further features and advantages will become apparent from the following description of examples which is made with reference to the accompanying drawings.

DETAILED DESCRIPTION OF CERTAIN INVENTIVE EMBODIMENTS

Details of systems and methods according to examples will become apparent from the following description, with reference to the Figures. In this description, for the purpose of explanation, numerous specific details of certain examples are set forth. Reference in the specification to "an example" or similar language means that a particular feature, structure, or characteristic described in connection with the example is included in at least that one example, but not necessarily in other examples. It should further be noted that certain examples are described schematically with certain features omitted and/or necessarily simplified for ease of explanation and understanding of the concepts underlying the examples.

A neural network typically includes several interconnected nodes, which may be referred to as artificial neurons, or neurons. The internal state of a neuron (sometimes referred to as an "activation" of the neuron) typically depends on an input received by the neuron. The output of the neuron may then depend on the input, a weight, a bias and an activation function. The output of some neurons is connected to the input of other neurons, forming a directed, weighted graph in which vertices (corresponding to neurons) or edges (corresponding to connections) of the graph are associated with weights, respectively. The neurons may be arranged in layers such that information may flow from a given neuron in one layer to one or more neurons in a successive layer of the neural network. Examples include an object classifier executing in a neural network accelerator.

Figure 1:
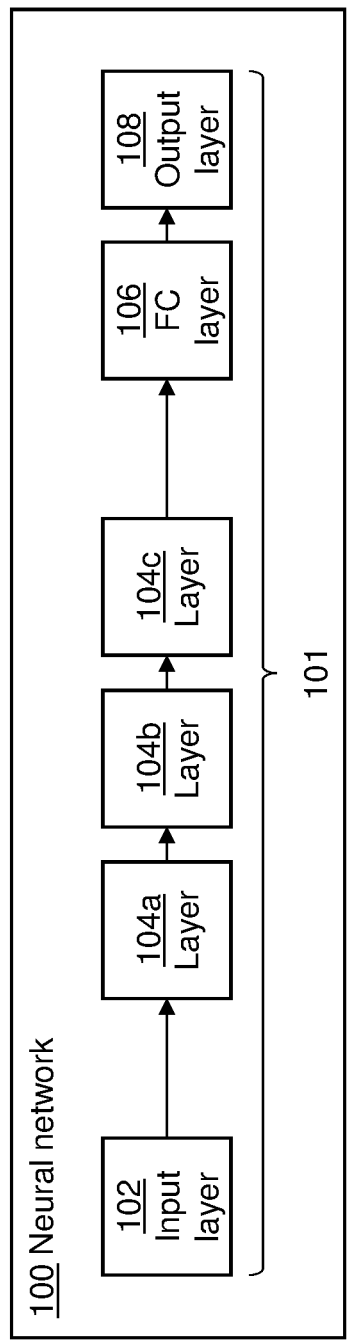
FIG. 1 schematically shows a neural network according to examples.

FIG. 1 schematically shows a neural network 100 according to examples. The neural network 100 comprises a plurality of layers 101. In FIG. 1, the neural network 100 is a convolutional neural network (CNN). In other examples, the neural network 100 may be a different kind of neural network. An example of a CNN is the VGG-16 CNN, although other CNNs may be used instead. A typical CNN includes an input layer 102, a plurality of convolutional layers (three of which, 104a, 104b, 104c, are shown in FIG.

1), at least one fully connected layer 106, and an output layer 108. In some cases, however, a CNN may not have a fully connected layer 106.

The input layer 102 for example corresponds with an input to the neural network 100, which may be sensor-originated data such as image data, video data, and/or audio data. In this example, the input is image data. The image data is, for example, 224 pixels wide and 224 pixels high and includes 3 color channels (such as a red, green and blue color channel).

The convolutional layers 104a, 104b, 104c typically extract particular features from the input data, to create feature maps. The at least one fully connected layer 106 can then use the feature maps for further processing, e.g. object classification. The fully connected layer(s) may execute object definitions, in the form of object classes, to detect the presence of objects conforming to the object classes in the image data. In FIG. 1, the neural network 100 includes solely one fully connected layer 106. However, in other examples, the neural network 100 may include a plurality of fully connected layers, with an output of one of the fully connected layers being received as an input by a subsequent fully connected layer.

In some cases, the output of one convolutional layer 104a undergoes pooling before it is input to the next layer 104b. Pooling for example allows values for a region of an image or a feature map to be aggregated or combined, for example by taking the highest value within a region. For example, with "2×2 max" pooling, the highest value of the output of the layer 104a within a 2×2 patch of the feature map output from the layer 104a is used as an input to the 104b, rather than transferring the entire output of the layer 104a to the layer 104b. This reduces the amount of computation for subsequent layers of the neural network 100. Further pooling may be performed between other layers of the neural network 100. Conversely, pooling may be omitted in some cases. It is to be appreciated that the neural network 100 has been greatly simplified for ease of illustration and that typical neural networks may be significantly more complex.

In general, neural network systems such as the neural network 100 of FIG. 1 may undergo what is referred to as a "training phase", in which the neural network is trained for a particular purpose. As described, a neural network typically includes several interconnected neurons forming a directed, weighted graph in which vertices (corresponding to neurons) or edges (corresponding to connections) of the graph are associated with weights, respectively. The weights may be adjusted throughout training, altering the output of individual neurons and hence of the neural network as a whole. In a CNN, a fully connected layer typically connects every neuron in one layer to every neuron in another layer. Fully connected layers may therefore be used to identify overall characteristics of an input, such as whether an object of a particular class, or a particular instance belonging to the particular class, is present in an input image, video, or sound as part of an object classification process.

In the example of FIG. 1, the neural network 100 has been trained to perform object detection by processing image data, for example to determine whether an object of a predetermined class of objects is present in the image represented by the image data (although in other examples the neural network 100 may have been trained to identify other image characteristics of the image instead). Training the neural network 100 in this way may generate one or more kernels associated with at least some of the layers (such as layers of the neural network 100 other than the input layer 102 and the output layer 108). Hence, the output of the training may be a plurality of kernels associated with a predetermined neural network architecture (for example with different kernels being associated with different respective layers of a multi-layer neural network architecture). The kernel data may be considered to correspond to weight data representative of weights to be applied to image data, as each element of a kernel may be considered to correspond to a weight, respectively. Each of these weights may be multiplied by a corresponding pixel value of an image patch, to convolve the kernel with the image patch as described below.

The kernels may allow features of the input to be identified. For example, in the case of image data, some of the kernels may be used to identify edges in the image represented by the image data and others may be used to identify horizontal or vertical features in the image (although this is not limiting, and other kernels are possible). The precise features that the kernels are trained to identify may depend on the image characteristics, such as the class of objects, that the neural network 100 is trained to detect. The kernels may be of any size. As an example, each kernel may be a 3×3 matrix of values, which may be convolved with the image data with a stride of 1. The kernels may be convolved with an image patch (or a feature map obtained by convolution of a kernel with an image patch) to identify the feature the kernel is designed to detect. Convolution generally involves multiplying each pixel of an image patch (in this example a 3×3 image patch), or each element of a feature map, by a weight in the kernel before adding the result of this operation to the result of the same operation applied to neighboring pixels or neighboring feature map elements. A stride, for example, refers to the number of pixels or feature map elements a kernel is moved by between each operation. A stride of 1 therefore indicates that, after calculating the convolution for a given 3×3 image patch, the kernel is slid across the image by 1 pixel and the convolution is calculated for a subsequent image patch. This process may be repeated until the kernel has been convolved with the entirety of the image (or the entire portion of the image for which a convolution is to be calculated), or with the entirety of a feature map the kernel is to be convolved with. A kernel may sometimes be referred to as a "filter kernel" or a "filter". A convolution generally involves a multiplication operation and an addition operation, sometimes referred to as a multiply-accumulate (or "MAC") operation. Thus, a neural network accelerator configured to implement a neural network, such as that of FIG. 3, may include a multiplier-accumulator (MAC) unit configured to perform these operations.

After the training phase, the neural network 100 (which may be referred to as a trained neural network 100) can be used to detect the presence of objects of a predetermined class of objects in input images. This process may be referred to as "classification" or "inference". Classification typically involves convolution of the kernels obtained during the training phase with image patches of the image input to the neural network 100 to generate a feature map. The feature map may then be processed using at least one fully connected layer 106, e.g. to classify the image; although other types of processing may be performed.

In the example of FIG. 1, the layer 104a involves the convolution of 64 different kernels with the image data of the input layer 102. Each of the 64 kernels is, for example, arranged to identify a different respective feature of the image data. In an illustrative example in which the image data is 224×224 pixels in size, with 3 color channels, and is convolved with 64 kernels of a size of 3×3 pixels, the layer 104a of the neural network 100 involves 224×224×3×(3×3)×64 multiply-accumulate operations, i.e. 86 million MAC operations. There will also be many further multiply-accumulate operations associated with each of the further layers 104b, 104c, 106 of the neural network 100. As will be appreciated, though, other neural networks may involve convolutions with a different number of kernels, which may be of a different size. Nevertheless, processing an image to identify an image characteristic such as the presence of an object of a predetermined class, or a particular instance of the object, typically involves a large number of data processing operations, each of which consumes power.

In the example of FIG. 1, image data received by the input layer 102 of the neural network 100 is processed using layers 104a, 104b, 104c to generate feature data. The sensor-originated image data may represent at least one characteristic of the light captured by an image sensor, such as an intensity of the light captured by each sensor pixel, which may be proportional to the number of photons captured by that sensor pixel. The intensity may represent a luminance of the captured light, which is for example a measure of the intensity of light per unit area rather than an absolute intensity. In other examples, the image data may be representative of a brightness of captured light, which may be considered to correspond to a perception of a luminance, which may or may not be proportional to the luminance. In general, the image data may represent any photometric quantity or characteristic that may be used to represent the visual appearance of the image represented by the image data or may be derived from any such photometric quantity or characteristic. The image data may be in any suitable format, such as a raw image format. For example, the image data may be streamed from the image sensor, with or without being saved to a framebuffer, without saving the raw image data to memory. In such cases, image data obtained after processing of the raw image data may, however, be written to memory.

In this example, the layers 104a, 104b, 104c of the neural network 100 may be used to generate feature data representative of at least one feature of the image. The feature data may represent an output feature map, which may be output from a convolutional layer of a CNN such as the neural network 100 of FIG. 1. There may be more or fewer layers in the neural network 100 than those shown in FIG. 1. In examples in which the neural network 100 includes a plurality of layers 104a, 104b, 104c between the input layer 102 and the fully connected layer 106 and/or the output layer 108, as shown in FIG. 1, each of the said plurality of layers 104a, 104b, 104c may be used to generate intermediate feature data. The intermediate feature data may be representative of at least one feature of the input, e.g. the image. The intermediate feature data output from one of the layers (e.g. layer 104a) may be input to a subsequent layer of the neural network 100 (e.g. layer 104b) to identify further features of the image represented by the image data input to the neural network 100.

Although not shown in FIG. 1, it is to be appreciated that further processing may be applied to the sensor-originated (e.g. audio or image data) after it has been obtained by an a sensor (e.g. an audio or image sensor) and before the sensor-originated data is processed by the layers of the neural network 100. Said further processing may be performed by other components of a data processing system or as part of the neural network 100 itself.

Figure 2:
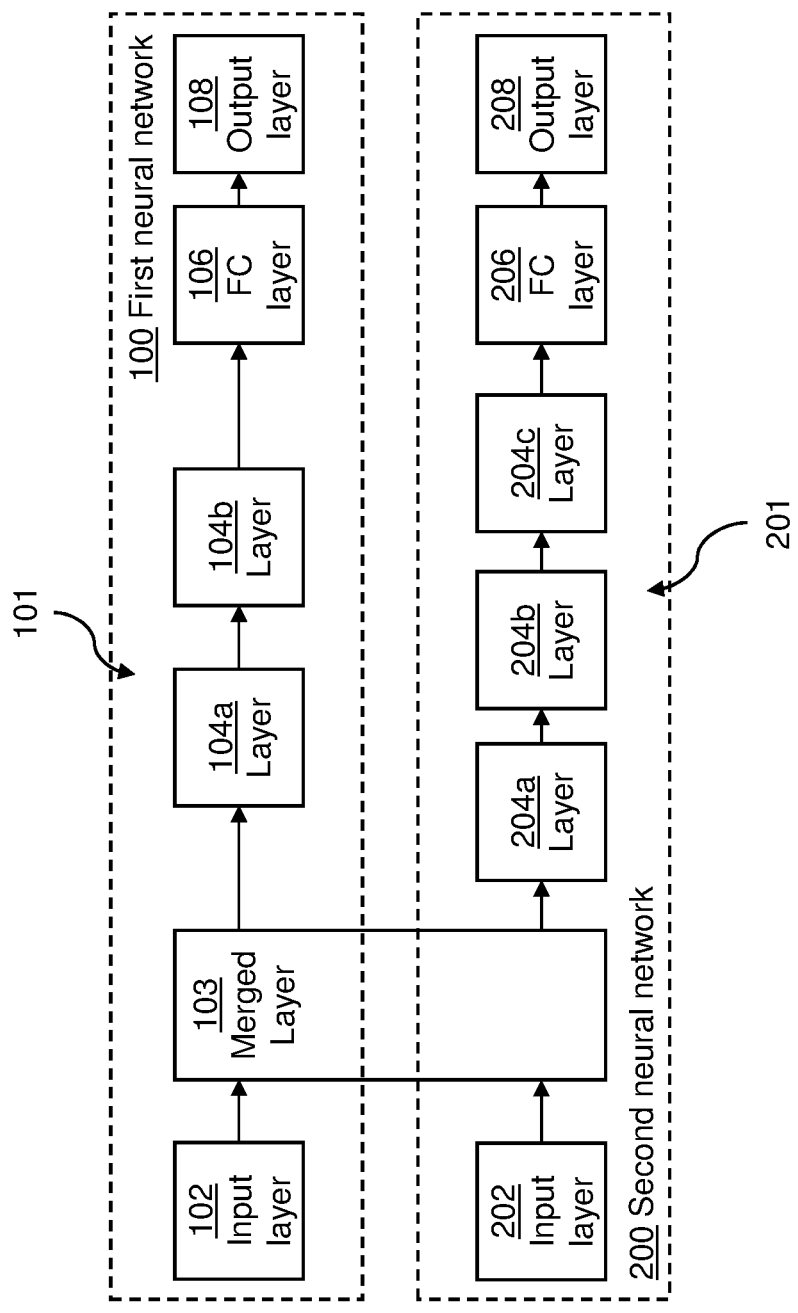
FIG. 2 schematically shows a neural network system, including first and second neural networks, according to examples.

FIG. 2 shows an example in which a neural network system comprises a merged layer 103 shareable between a first neural network 100 and a second neural network 200. The first neural network 100 and/or the second neural network 200 may correspond to the example neural network described with reference to FIG. 1. For example, each of the first and second neural networks 100; 200 may have a plurality of layers 101, 201 such as respective input layers 102, 202, convolutional layers 104a, 104b; 204a, 204b, 204c, fully connected layers 106, 206, and output layers 108, 208. These layers may function in a similar way to the corresponding layers described with reference to the neural network of FIG. 1. In some examples, the merged layer 103 may be shareable between more than two neural networks.

Figure 3:
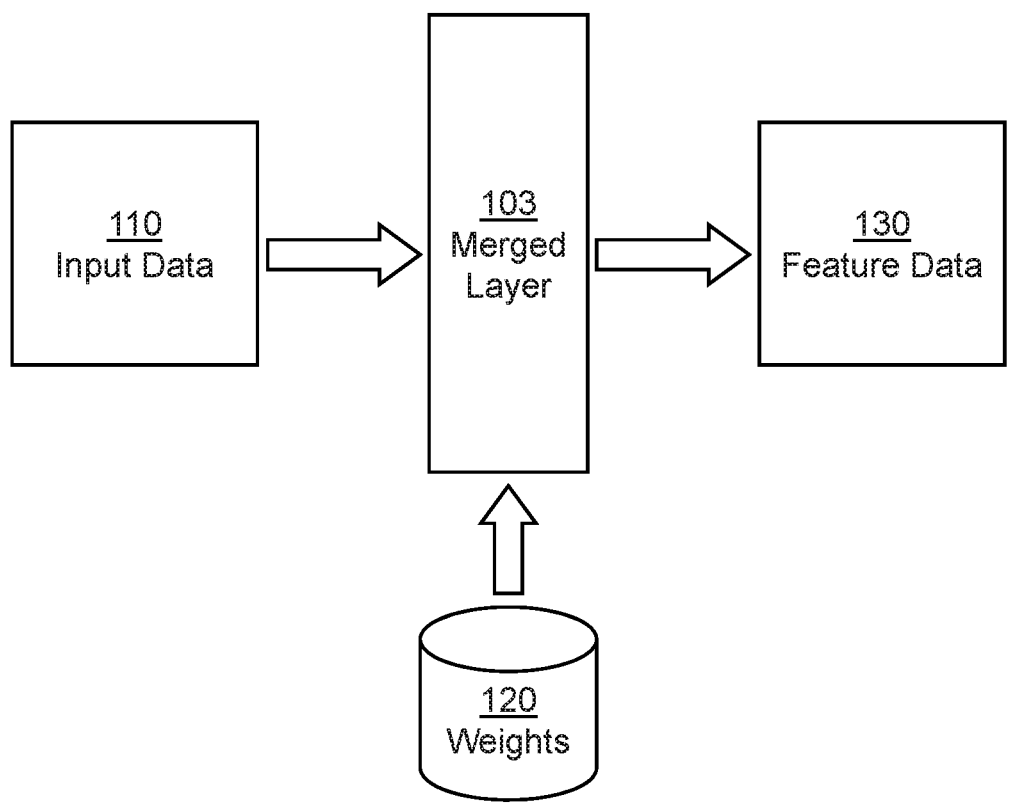
FIG. 3 schematically shows a merged layer of a neural network system according to examples.

With reference to FIGS. 2 and 3, the merged layer 103 is configured to receive input data 110 from a prior layer 102, 202 of at least one of the first and second neural networks 100, 200. The prior layer 102, 202 of the at least one of the first and second neural networks 100, 200 may be the input layer of the first and/or second neural network 100, 200 in examples. The input data may comprise sensor-originated data. For example, the sensor-originated data may comprise one or more of image data, video data, and audio data, or another form of sensor-originated data. The sensor-originated data may be source data, or "raw data", output directly from a sensor (e.g. sensor data). In such cases, the sensor-originated data may be obtained from the sensor, e.g. by direct transfer of the data or by reading the data from intermediate storage on which the data is stored. In other cases, the sensor-originated data may have been preprocessed: for example, further processing may be applied to the sensor-originated data after it has been obtained by the sensor and before it is processed by the merged layer 103. In some examples, the sensor-originated data comprises a processed version of the sensor data output by the sensor. For example, the sensor data (or preprocessed version thereof) may have been subsequently processed: the input data 110 received at the merged layer 103 may thus be the output of such subsequent processing of the (preprocessed) source data. The subsequent processing may be that performed at the prior layer 102, 202 of at least one of the first and second neural networks 100, 200 when the prior layer 102, 202 is not an input layer of the first and second neural networks 100, 200, for example. In other examples, the subsequent processing may be formed at one or more other neural networks. Thus, the sensor-originated data may comprise feature data representative of one or more features of the sensor-originated data. For example, the feature data may represent a feature map, which may have been outputted from a convolutional layer of a CNN like the neural network 100 of FIG. 1. The input data 110 (e.g. a feature map) may therefore be accessed (e.g. read or "fetched" from storage) once by the merged layer 103, compared to being accessed multiple times by separate layers belonging only to the respective neural networks 100, 200. Thus, implementing a merged layer as described may reduce the number of storage accesses needed and thus improve the efficiency of the neural network system.

The merged layer 103 is configured to apply a superset of weights 120 to the input data 110 to generate intermediate feature data 130 representative of at least one feature of the input data 110. The superset of weights 120 is combined from a first set of weights associated with the first neural network 100 and a second set of weights associated with the second neural network 200. The first set of weights may be an outcome of training the first neural network 100, and the second set of weights may be an outcome of training the second neural network 200, for example. In some cases, the merged layer 103 may have been produced by merging respective layers from the first and second neural networks 100, 200, with the said layers being respectively associated with the first and second sets of weights. The respective layers may have been configured to receive the same input data. The respective layers may have been trained independently of one another, as part of their respective neural network 100, 200, to produce the first and second sets of weights.

Implementing the merged layer 103 to apply the superset of weights 120 may allow for fewer memory accesses compared to reading the first and second sets of weights separately from storage, and thus allow for more efficient processing of the neural network system.

For example, a first layer serving the first neural network 100 may be merged with a second layer serving the second neural network 200 to form the merged layer 103. The merging may involve combining the first and second sets of weights, e.g. stored in storage, to form the superset of weights as described herein. The first and second layers may then be replaced with the merged layer 103 shared between the first and second neural networks 100, 200. In examples, the first and second layers may be the first unique layers of the first and second neural networks 100, 200. For example, layers of the first and second neural networks 100, 200 prior to the respective first and second layers may be the same (having the same weights etc.). Additionally, or alternatively, such prior layers of the first and second neural networks 100, 200 may be shared by the first and second neural networks 100, 200; having sets of weights associated with one of the first and second neural networks 100, 200 (as described herein with reference to FIG. 4).

In examples, the superset of weights is applicable to the input data in the form of a kernel. For example, as described, each element of the kernel may be considered to respectively correspond to a weight in the superset of weights. Each of these weights may be multiplied by a corresponding data value in the input data, e.g. a pixel value of an image patch, to convolve the kernel with the input data as described above for image data. The kernel may be applied to a part of the input data (e.g. an image patch of input image data) to identify a feature in the input data that the kernel is designed or trained to detect. The kernel may then be applied to another part of the input data (e.g. another image patch) as part of the convolution. For example, the kernel may be slid across an image in steps of a given size (e.g. a number of pixels) known as the stride of the kernel, as described above.

The first and second sets of weights, which are combined to form the superset of weights, may be applicable to the input data in the form of respective first and second kernels. For example, each element of the first kernel may be considered to respectively correspond to a weight in the first set of weights. Similarly, each element of the second kernel may be considered to respectively correspond to a weight in the second set of weights. Therefore, the first kernel may be an outcome of training the first neural network 100, and the second kernel may be an outcome of training the second neural network 200, for example. The first and second kernels may have thus been obtained by training the first and second neural networks 100, 200 independently of one another, and with respective independent layers instead of the merged layer 103. The first and second kernels may thus be respective outcomes of training the said independent layers as part of their respective first and second neural networks 100, 200. The first and second kernels may each be of any size. The first and second kernels may have the same dimensionality, e.g. both be 2-dimensional or 3-dimensional. In some examples, the first and second kernels have the same dimensions. For example, each of first and second kernels may be m×n×q elements in size (e.g. 3×3×3 or 3×3×64 pixel in size where the input is image data). In some examples, the first and second kernels are applicable to the input data using the same stride. For example, the elements of the first and second kernels may have been trained by applying each of the first and second kernels to training input data using the same stride, e.g. sliding the first and second kernels over training image data by the same number of pixels each time. Additionally, or alternatively, the first and second kernels may be applicable to the input data using a same processing frequency and/or resolution. For example, the first and second networks 100, 200 may be configured to process the same region or different regions. In the latter case, the first neural network 100 may be configured to process only a central region of an image, whereas the second neural network 200 is configured to process the entire image, for example.

In examples, the first and second kernels are associated with the same activation function. As referenced above, the output of a neuron in a given neural network may depend on an activation function associated with the neuron. For example, the activation function may map results, obtained from processing at the neuron, into a range of possible output values. The resulting output of the neuron may then be fed as an input to a subsequent node. Thus, in the present example, the first and second kernels may be associated with the same activation function for generating output data at their respective independent layers of the first and second neural networks 100, 200. The kernel corresponding to the superset of weights may thus be associated with the said same activation function when used to generate the intermediate feature data 130 at the merged layer 103. Alternatively, in other examples, the first and second kernels may be associated with, e.g. use, different activation functions. In examples, the merged layer 103 is also configured to apply a superset of activation functions to generate the intermediate feature data. The superset of activation functions may be combined from a first set of one or more activation functions associated with the first neural network and a second set of one or more activation functions associated with the second neural network. Additionally, or alternatively, the merged layer 103 may be configured to apply a superset of biases to generate the intermediate feature data. The superset of biases (e.g. bias data) may be combined from a first set of bias data, e.g. comprising one or more biases, associated with the first neural network and a second set of bias data, e.g. comprising one or more biases, associated with the second neural network. For example, a merged layer formed from three respective layers across three neural networks will have a superset of weight data combined from three sets of weights and could have a superset of bias data formed from three sets of biases and/or be associated with three different activation functions.

The merged layer 103 is configured to output the intermediate feature data 130 to at least one subsequent layer 104a, 204a, the at least one subsequent layer 104a, 204a serving the first and second neural networks 100, 200. In some examples, the at least one subsequent layer may be another merged layer serving both first and second neural networks 100, 200. In other examples, the at least one subsequent layer may comprise respective subsequent layers 104a, 204a of the first and second neural networks 100, 200 as shown in FIG. 2.

In examples, the intermediate feature data comprises a feature map having first and second regions corresponding respectively to the first and second sets of weights. For example, the first region of the feature map may comprise data obtained by applying the first set of weights in the superset of weights to the input data. Similarly, the second region of the feature map may comprise data obtained by applying the second set of weights in the superset of weights to the input data. In an example, the kernel corresponding to the superset of weights may be applied to the input data, e.g. by convolution, to generate the feature map having first and second regions corresponding respectively to the first and second sets of weights.

In some cases, more than one kernel corresponding to the superset of weights may be applied to the input data. The one or more kernels corresponding to the superset of weights may be formed from the first and second kernels corresponding to the first and second sets of weights, respectively. For example, the first and second kernels joined together may form the kernel corresponding to the superset of weights. Since the operations involved in applying the superset of weights to the input data (e.g. by convolution of the corresponding kernel with the input data) are deterministic, the position and dimensions of the outcome of those operations is determinable separately to the resultant values. Thus, the position and dimensions of the first and second regions in the output feature map may be determinable separately to the resultant values determined by applying the superset of weights to the input data. In some examples, the merged layer 103 is configured to output metadata indicating the first and second regions. For example, the metadata may indicate the position and dimensions of the first and second regions in the output feature map. The metadata may include an indication linking at least one of the first and second regions with the corresponding set of weights from the first and second sets of weights.

In examples, the at least one subsequent layer in the neural network system is configured to obtain a corresponding region of the first and second regions of the feature map. For example, where the at least one subsequent layer comprises respective subsequent layers 104a, 204a of the first and second neural networks 100, 200 (as shown in FIG. 2), a first subsequent layer 104a of the first neural network 100 may be configured to obtain the first region of the feature map outputted by the merged layer 103. Similarly, a second subsequent layer 204a of the second neural network 200 may be configured to obtain the second region of the feature map outputted by the merged layer 103. This may be done using the metadata, output by the merged layer 103, which indicates the position and dimensions of the first and second regions in the output feature map. Additionally, or alternatively, respective dimensions of the first and second regions may be determined, and the first and second subsequent layers 104a, 204a may be configured to obtain the first and second regions, respectively, based on the determined dimensions thereof. The respective dimensions of the first and second regions may be determined based on the dimensions of the input data and kernel(s) associated with the merged layer 103, for example. In certain examples, the merged layer 103 is configured to output a corresponding region of the first and second regions to the at least one subsequent layer. For example, where the at least one subsequent layer is another merged layer, the merged layer 103 may be configured to output both first and second regions of the generated feature map to the another, subsequent, merged layer.

In some examples, the intermediate feature data generated and outputted by the merged layer 103 comprises first and second feature maps, corresponding respectively to the first and second sets of weights, which are separately output from the merged layer. For example, the first feature map may comprise data obtained by applying the first set of weights in the superset of weights to the input data. Similarly, the second feature map may comprise data obtained by applying the second set of weights in the superset of weights to the input data. The first and second feature maps are separately output by the merged layer 103. For example, the first and second feature maps may be written to different storage or different regions of a common storage. In an example, the kernel corresponding to the superset of weights may be applied to the input data, e.g. by convolution, to generate the first and second feature maps corresponding respectively to the first and second sets of weights.

As described above, the one or more kernels corresponding to the superset of weights may be formed from the first and second kernels corresponding to the first and second sets of weights, respectively. Given the deterministic nature of applying the superset of weights to the input data (e.g. by convolution of the corresponding kernel with the input data), the location and/or dimensions of the outcome of those operations is determinable separately to the resultant values. Thus, the location and/or dimensions of the first and second feature maps may be determinable separately to the obtainable values. The first and second feature maps may be written to storage in different locations, for example. In some examples, the merged layer 103 is configured to output metadata indicating the storage location(s) of the first and second feature maps. The merged layer 103 may be configured to output metadata indicating the correspondence of the first and second feature maps with the first and second sets of weights, in a similar way to that described above for the output feature map comprising first and second regions corresponding to the first and second sets of weights.

In some examples, the at least one subsequent layer comprises a first subsequent layer 104a of the first neural network 100 and a second subsequent layer 204a of the second neural network 200. The merged layer 103 may be configured to output the generated first and second feature maps to the first and second subsequent layers 104a, 204a respectively.

Figure 4:
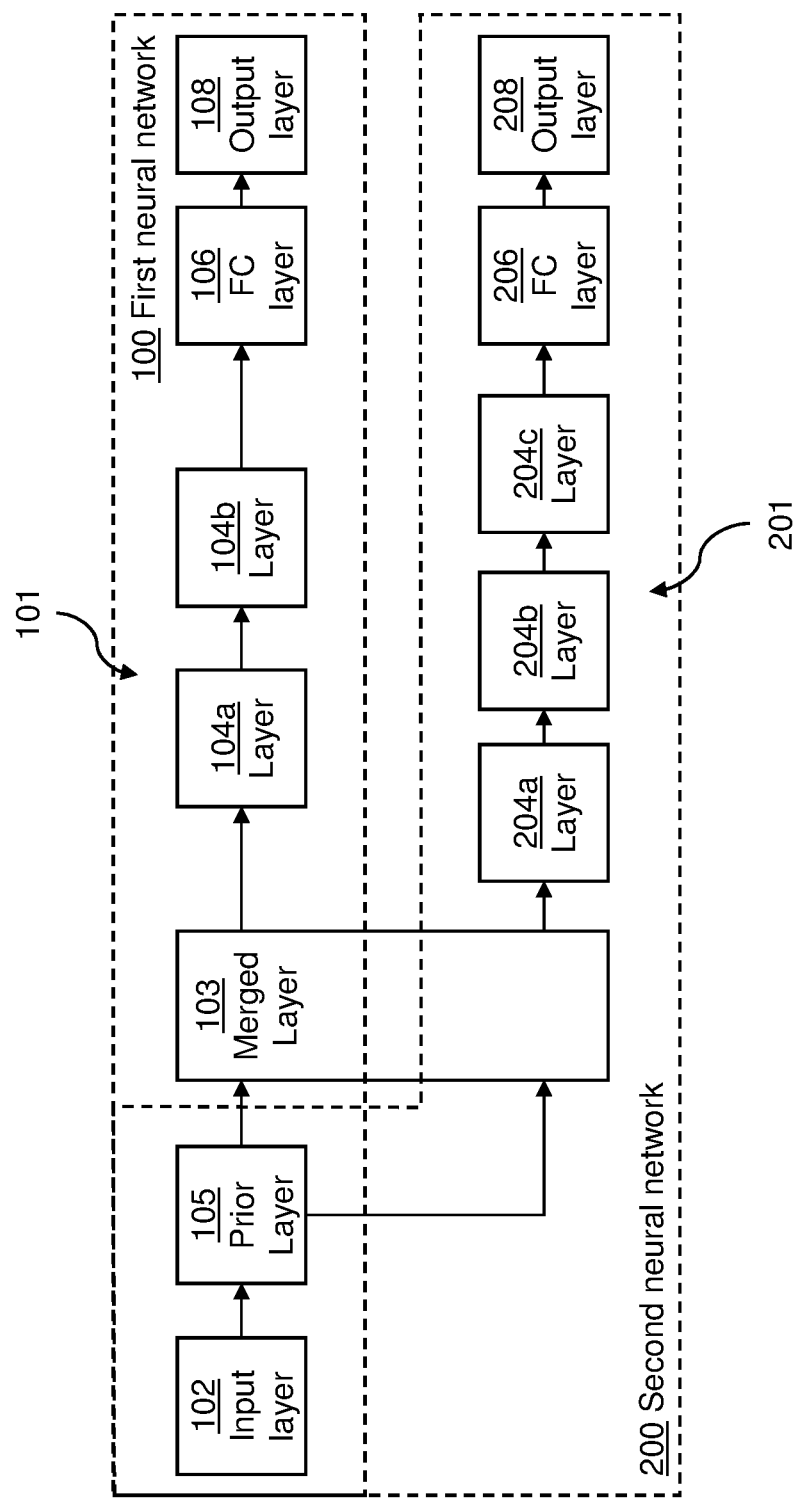
FIG. 4 schematically shows a neural network system, including first and second neural networks, according to examples.

In examples, the prior layer of at least one of the first and second neural networks 100, 200 comprises a same layer serving both of the first and second neural networks 100, 200. FIG. 4 shows an example in which the first neural network 100 and the second neural network 200 share the same prior layer 105 (and input layer 102). The prior layer 105 is configured to generate the input data for the merged layer 103. Thus, the output of the shared prior layer 105 may be received as the input to the merged layer 103 when the first neural network 100 and/or the second neural network 200 is selected to process data received at the input layer 102. In examples, the first and second neural networks 100, 200 share a plurality of such prior layers 105.

The initial layers of a neural network may identify more general features of the input data. For example, more general features of image data may be those features which are present in images of a wide range of different scenes or objects. Thus, two neural networks trained to identify cars in images, but of different complexities, may nevertheless have similar or identical initial layers, which identify general image features such as edges, corners, or ridges in the images. Subsequent layers in these neural networks may be different, however, in order to perform a higher-level determination of whether lower-level image features correspond to a particular class of object (e.g. a car), depending on what the neural networks have been trained to detect.

Thus, by sharing at least one such initial layer 105, the first and second neural networks 100, 200 may store less weight data, corresponding to the weights associated with the at least one shared prior layer 105, compared to implementing the respective initial layers of the first and second neural networks 100, 200 separately. The set of weights associated with the at least one shared prior layer 105 are not a superset of weights combined from sets of weights associated with the different neural networks 100, 200, as for the merged layer 103. The same set of weights associated with the at least one shared prior layer 105 are associated with each of the different neural networks 100, 200. For example, the at least one shared prior layer 105 may be trained as part of the first or second neural network 100, 200. The set of weights resulting from the training of the at least one shared prior layer 105 are then used when executing the at least one shared prior layer 105 as part of the first neural network 100 and/or second neural network 200. Furthermore, by sharing at least one such initial layer 105, the associated processing at the at least one such initial layer 105 may be performed only once, thus reducing the processing requirements across the first and second neural networks 100, 200.

Having at least one shared prior layer 105 feeding its output to the merged layer 103 allows for less weight data to be stored, as described above, and allows for more efficient processing. For example, rather than fetching the same output of the at least one shared prior layer 105 at separate subsequent layers of the first and second NNs 100, 200, the merged layer 103 shared between the NNs 100, 200 can fetch the data once and process the input data for both NNs 100, 200 using the superset of weights, as described. In this way, fewer memory accesses are needed to process the output of the at least one shared prior layer 105, thereby increasing processing efficiency.

In some examples, at least one of the first and second neural networks 100, 200 comprises a fused layer as one of its subsequent layers to the merged layer 103. Forming such a fused layer may involve combining respective sets of weights associated with separate sequential layers of the given neural network. The combined sets of weights may then be applied as a single set of weights at the fused layer. For example, typically a layer within a neural network is processed at a time. Therefore, the input to that layer, e.g. an input feature map, is convolved with the kernels associated with the layer and an activation function, if present, is performed on the result of the convolution. The output of the layer may then be written out, e.g. as an output feature map, to storage. The storage may be internal storage in some examples, e.g. if the stored size of the output is smaller than a predetermined threshold the output may be written to internal storage. The storage may additionally or alternatively include external storage in other examples, e.g. if the stored size of the output is larger than the predetermined threshold the output may be written to external storage. For a fused layer, however, the input feature map may be read, or "fetched", and multiple sub layers of processing then performed before writing out the output feature map. The processing of these fused sub layers is performed together. This has the advantage that intermediate data generated by the multiple sub layers within the fused layer need not be written out, thereby reducing storage accesses and power consumption. In some cases, the merged layer 103 may have been formed by fusing two or more separate merged layers shareable between multiple neural networks. In other cases, the merged layer 103 may have been formed by merging two or more separate fused layers belonging to respective neural networks.

In accordance with the present disclosure, there is also provided a data processing method, e.g. for a data processing system comprising a neural network system. The method involves receiving data in the form of sequential data frames. For example, the data in the form of sequential data frames may comprise sensor-originated data such as one or more of image data, video data, and audio data, as previously described. The method further involves performing data processing in processing cycles. In a given processing cycle, data processing is performed using one or more neural networks in a selected data frame. A processing cycle may be a cycle in which the input data frame, e.g. audio frame, is passed through the sequence of layers, from the input layer to the output layer, of the one or more neural networks utilized in that cycle. Not all layers of the one or more neural networks need be used during a processing cycle; for example, one or more of the convolutional layers may be omitted from processing during a processing cycle in order to reduce data processing requirements during the cycle.

The data processing method also includes configuring a first processing cycle and a second processing cycle. In the first processing cycle, the first neural network of the one or more neural networks is executed. In the second processing cycle, the first and second neural networks of the one or more neural networks are executed together. The first and second neural networks together form a neural network system as previously described, wherein the first and second neural networks 100, 200 comprise the merged layer 103 when executed. One or more types of data processing may be performed as part of a given processing cycle. Examples include object classification, speech or natural language recognition, and image segmentation. For example, the first and second processing cycles may comprise first and second object classification cycles, respectively, in which object classification is performed by the first and second neural networks, respectively, e.g. as part of an object classification system.

In examples, the first neural network 100 may be executed at a first frequency as part of the first and second processing cycles. The second neural network 200 may be executed at a second frequency as part of the second processing cycle. In certain cases, one of the first and second frequencies is a multiple of another one of the first and second frequencies. For example, the first frequency may be twice the second frequency, such that the first neural network is executed (alone or together with the second neural network) twice as often as the second neural network is executed (together with the first neural network). In this example, the first and second processing cycles would alternate at the same frequency. In other examples, the first frequency may be three times the second frequency, such that between executions of the first and second NNs together in the second cycle, the first NN 100 is executed twice without the second NN 200 in the first cycle.

In an example object classification process, a first neural network 100 trained to detect gestures of a person may be run at a higher frequency than a second neural network 200 trained to identify a face of a person. Thus, in a first cycle, the first (gesture recognition) NN 100 is executed and the second (facial recognition) NN 200 is not executed. Then, in a second cycle, the two NNs 100, 200 are executed together and the merged layer 103 shared between the two NNs 100, 200 is used in the second cycle. In some examples, the merged layer 103 is not used when the first neural network 100 is executed in the first cycle. For example, the merged layer 103 may be replaced by a different layer serving only the first NN 100. This layer may apply the first set of weights, forming part of the superset of weights applied by the merged layer 103, which are associated with the first NN 100, for example. Additionally or alternatively to the first and second neural networks 100, 200 operating at different frequencies, the first and second neural networks 100, 200 may operate with different resolutions and/or on different regions of the data frames.

The first and second frequencies may be determined, in examples, in response to control data derived from one or more data sources external to the object classifier. The one or more data sources may comprise one or more sensors external to the object classifier, the one or more sensors being arranged to generate sensor data. The control data may be derived at least in part from the sensor data. Such data sources may comprise one or more of:

a. a location sensor arranged to generate sensor data indicative of geographic location;

b. a temperature sensor arranged to generate sensor data indicative of ambient temperature;

c. a visual information sensor arranged to generate sensor data indicative of semantic information in image or video data, such as barcode data and/or vehicle number plate recognition data;

d. an audio information sensor arranged to generate sensor data indicative of audio data;

e. a speed sensor arranged to generate sensor data indicative of a speed of travel;

f. an acceleration sensor arranged to generate sensor data indicative of an amount of acceleration;

g. a radio signal sensor arranged to generate sensor data indicative of data carried by a radio signal, such as Wi-Fi™ access point identity information;

h. a movement sensor arranged to generate sensor data indicative of movement;

i. an image sensor, or camera, arranged to generate sensor data indicative of image or video data; and j. a simultaneous location and mapping (SLAM) module.

Figure 5:
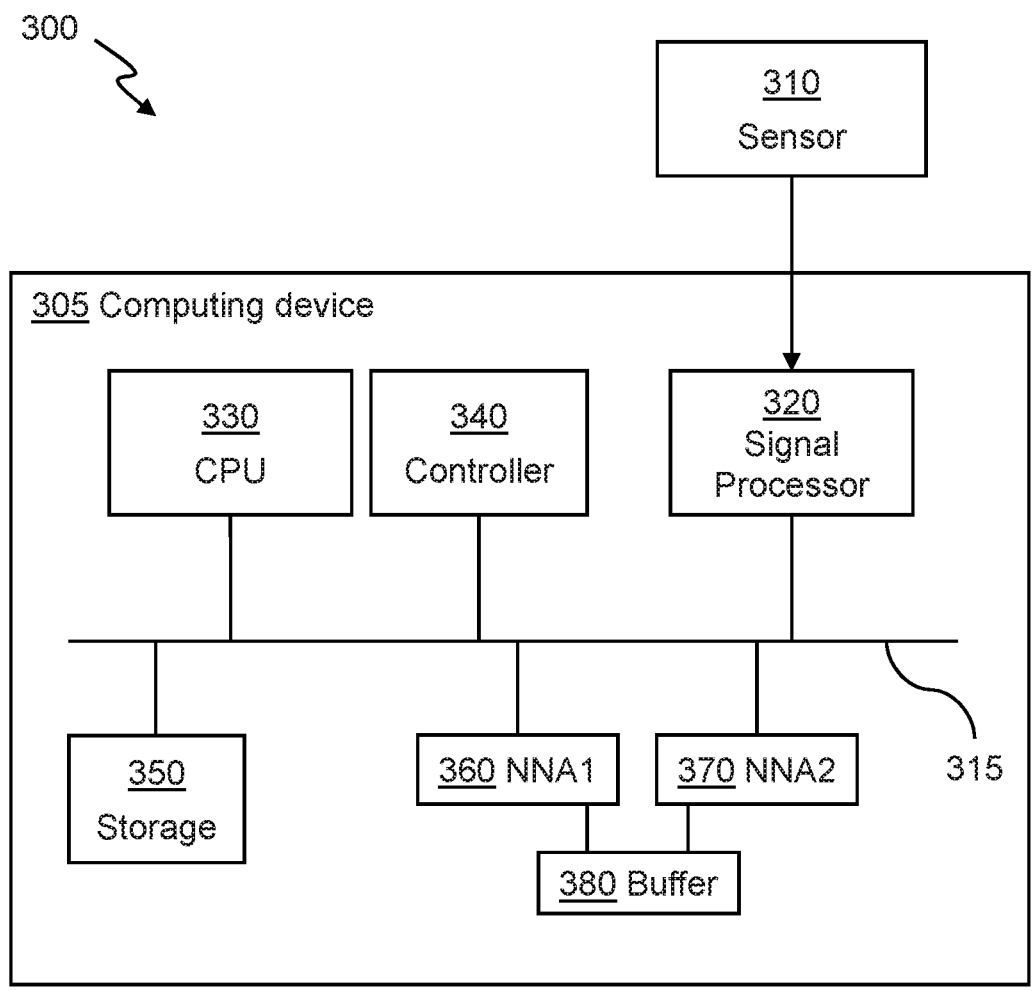
FIG. 5 schematically shows an example data processing system for use with the methods and neural network systems described herein.

An example of a data processing system 300 for use with the methods described herein is shown schematically in FIG. 5. The data processing system 300 of FIG. 5 may be coupled to or form part of a computing device 305, such as a personal computer, a laptop, a smartphone or an on-board computer device which may be coupled to or mounted within a vehicle.

The data processing system 300 of FIG. 5 includes a sensor 310. The sensor 310 may capture data representative of a physical quantity it is configured to detect. For example, the sensor 310 may comprise one or more of an audio sensor, a video sensor, or an image sensor configured to capture audio, video or image data, respectively. An image sensor typically includes an array of sensor pixels, which may be any suitable photosensors for capturing images. For example, a typical sensor pixel includes a photosensitive element such as a photodiode that can convert incident light into electronic signals or data. The sensor pixel may for example be a charge-coupled device (CCD) or a complementary metal-oxide-semiconductor (CMOS). The image sensor may be arranged to capture image data representative of an image. The image may form part of a video, which is typically a series of images captured sequentially. For example, the image may correspond to a frame of a video.

In FIG. 5, the sensor 310 is arranged to transfer captured data to a signal processor 320 of the computing device 305. The signal processor 320 may comprise a digital signal processor (DSP), a codec (e.g. an audio or video codec), or another type of processor configured to process signals. In examples where the sensor 310 comprises an image sensor, the signal processor 320 may comprise an image signal processor (ISP). The image sensor may be arranged to transfer captured image data to the ISP via a camera serial interface (CSI). The signal processor 320 may perform initial processing of the captured data to prepare the data for further processing or use. For example, the signal processor 320 comprising an ISP may perform saturation correction, renormalization, white balance adjustment and/or de-mosaicing on the captured image data, although this is not to be taken as limiting.

The data processing system 300 of FIG. 5 includes at least one processor. In this example, the data processing system 300 includes a central processor unit (CPU) 330 as part of the computing device 305. The data processing system 300 also includes at least one neural network accelerator. A neural network accelerator is, for example, a processor dedicated to implementing a neural network. For example, a neural network accelerator may be a processor dedicated to implementing classification of data using a neural network. The at least one neural network accelerator is configured to implement first and second neural networks such as those described above. In examples, the at least one neural network accelerator is a neural network accelerator (such as a single or sole neural network accelerator) that is configured to implement both the first and second neural networks. However, in the example of FIG. 5, the at least one neural network includes a first neural network accelerator (NNA1) 360 and a second neural network accelerator (NNA2) 370. The first neural network accelerator 360 may be configured to implement a first neural network 100 such as that described above, and the second neural network accelerator 370 may be configured to implement a second neural network 200 such as that described above.

In other examples, though, the data processing system 300 may include other or alternative processors such as a microprocessor, a general purpose processor, a DSP, an application specific integrated circuit (ASIC), a field programmable gate array (FPGA) or other programmable logic device, a discrete gate or transistor logic, discrete hardware components, or any suitable combination thereof designed to perform the functions described herein. The data processing system 300 may additionally or alternatively include a processor implemented as a combination of computing devices, e.g., a combination of a DSP and a microprocessor, a plurality of microprocessors, one or more microprocessors in conjunction with a DSP core, or any other such configuration. The data processing system 300 may also, or alternatively, include at least one graphics processing unit (GPU). The first and/or second neural network 100, 200 may be implemented by one or more of these other processors in examples.

The data processing system 300 of FIG. 5 includes a controller 340. In accordance with the methods described herein, the controller 340 is arranged to control the configuration of the first and second object classification cycles. The controller 340 may comprise hardware and/or software to control or configure the neural networks 100, 200. For example, the controller 340 may be implemented at least in part by computer software stored in (non-transitory) memory and executable by the processor. Alternatively, the controller 340 may be implemented at least in part by hardware, or by a combination of tangibly stored software and hardware (and tangibly stored firmware). In some examples, the controller 340 includes a processor and a memory. Computer executable code that includes instructions for performing various operations of the controller 340 described herein can be stored in the memory. For example, the functionality for controlling or interacting with the plurality of neural networks 100, 200 can be implemented as executable neural network control code stored in the memory and executed by the processor. As such, the executable code stored in the memory can include instructions for operations that when executed by processor cause the processor to implement the functionality described in reference to the example controller 340.

In other examples, the controller 340 may additionally or alternatively comprise a driver as part of the CPU 330. The driver may provide an interface between software configured to control or configure the neural networks and the at least one neural network accelerator which is configured to perform the processing to implement the neural networks. In other examples, though, a neural network may be implemented using a more general processor, such as the CPU or a GPU, as explained above.

The data processing system 300 of FIG. 5 also includes storage 350. The storage 350 is for example external to the neural network accelerator(s) 360, 370. The storage 350 may be a random-access memory (RAM) such as DDR-SDRAM (double data rate synchronous dynamic random-access memory). In other examples, the storage 350 may be or include a non-volatile memory such as Read Only Memory (ROM) or a solid-state drive (SSD) such as Flash memory. The storage 350 in examples may include further storage devices, for example magnetic, optical or tape media, compact disc (CD), digital versatile disc (DVD) or other data storage media. The storage 350 may be removable or non-removable from the data processing system 305. The storage 350 is for example arranged to store sensor-originated data, e.g. image data representative of at least part of an image, which may be received from the DSP 320. In some examples, the data processing system 305 of FIG. 5 also includes a dynamic memory controller (DMC) which may be used to control access to the storage 350 of the data processing system 305.

In addition to the storage 350, which may be system storage or a main memory, the data processing system 300 of FIG. 5 includes further storage (in this example a buffer 380 e.g. comprising cache storage) which is accessible to the at least one processor configured to implement the plurality of neural networks, in this case to the first and second neural network accelerators 360, 370. For example, the first and second neural network accelerators 360, 370 may each be configured to read and write feature data and/or weight data (as described above) to the buffer 380. Additionally, or alternatively, each neural network accelerator 360, 370 may comprise and/or have access to its own storage, e.g. a respective buffer 380.

In the example of FIG. 5, the data processing system 300 may be considered to include a neural network accelerator system including the first neural network accelerator 360 and the second neural network accelerator 370. In such examples, the buffer 380 may be a local storage of the neural network accelerator system, which is accessible to the first and second neural network accelerators 360, 370. For example, the neural network accelerator system including the first and second neural network accelerators 360, 370 may be implemented in hardware, for example on a chip, and the buffer 380 may be on-chip memory. The buffer 380 may be a static random-access memory (SRAM), for example, although other memory types are possible. In examples, the buffer 380 may be used to store weight data representative of weights corresponding to respective neurons in the different layers of the plurality of the neural networks. Thus, in examples described above in which one or more layers serve more than one neural network, e.g. the first and second neural networks, more weights may be stored in the buffer 380 (or whichever storage is used to store weight data) using the same amount of weight data than implementing the more than one neural network independently. Similarly, the superset of weights associated with the merged layer 103 may be stored together in the buffer 380.

In other examples, the data processing system 300 may not include such a buffer 380. In such cases, the first and second neural network accelerators 360, 370 may each be configured to read and write feature data and/or weight data (described above) to the storage 350, which is for example a main memory.

In other examples, in which a neural network accelerator is configured to implement both the first and second neural networks, the neural network accelerator may include local storage, similarly to the first and second neural network accelerators 360, 370 described with reference to FIG. 5. In such cases, the neural network accelerator may be configured to read and write feature data to the local storage. The local storage may be like the buffer 380 of FIG. 5, and the corresponding description thereof applies here also.

The components of the data processing system 300 in the example of FIG. 5 are interconnected on the computing device 305 using a systems bus 315. This allows data to be transferred between the various components. The bus 315 may be, or include, any suitable interface or bus. For example, an ARM® Advanced Microcontroller Bus Architecture (AMBA®) interface, such as the Advanced eXtensible Interface (AXI), may be used.

The above examples are to be understood as illustrative examples. Further examples are envisaged. For example, although in examples described above the first and second neural networks are each CNNs, in other examples other types of neural network may be used as the first and/or second neural networks. Furthermore, although in many examples described above, the first and second neural networks are configured to process image data, in other cases another form of sensor-originated data, e.g. audio data, is processable by the first and second neural networks in a corresponding way. As described, in some examples the sensor-originated data may be sensor data output by a sensor (e.g. the raw image or audio data), which may be obtained directly from the sensor or via intermediate storage. In other examples, as described herein, the sensor-originated data may comprise a processed version of the original sensor data output by the sensor, e.g. it may be feature data output by a neural network, which may be obtained directly from the neural network or via intermediate storage. In other words, the sensor-originated data originates from data, representative of a physical quantity, as captured by a sensor; the captured sensor data may have subsequently been processed so that the sensor-originated data, received as input at the merged layer, is derived from the original captured sensor data).

It is also to be understood that any feature described in relation to any one example may be used alone, or in combination with other features described, and may also be used in combination with one or more features of any other of the examples, or any combination of any other of the examples. Furthermore, equivalents and modifications not described above may also be employed without departing from the scope of the accompanying claims.

What is claimed is:

1. A neural network system including a memory storing instructions that are executable on a processor, the neural network system, when executed on the processor, comprising:

a first neural network comprising at least one subsequent layer in the first neural network;

a second neural network comprising at least one subsequent layer in the second neural network; and a merged layer, preceding the at least one subsequent layer of the first neural network and the at least one subsequent layer of the second neural network, the merged layer shared between the first neural network and the second neural network, wherein the at least one subsequent layer of the first neural network is separate from the at least one subsequent layer of the second neural network, wherein the merged layer is configured to:

receive input data from a prior layer of at least one of the first and second neural networks;

apply a superset of weights to the input data to generate intermediate feature data representative of at least one feature of the input data, the superset of weights being combined from a first set of weights associated with the first neural network and a second set of weights associated with the second neural network; and output the intermediate feature data to the at least one subsequent layer of the first neural network and to the at least one subsequent layer of the second neural network.

2. The neural network system of claim 1, wherein the input data comprises sensor-originated data.

3. The neural network system of claim 2, wherein the sensor-originated data comprises feature data representative of one or more features of the sensor-originated data.

4. The neural network system of claim 2, wherein the sensor-originated data comprises one or more of: image data; video data; and audio data.

5. The neural network system of claim 1, wherein the superset of weights is applicable to the input data in a kernel form.

6. The neural network system of claim 1, wherein the first and second sets of weights are applicable to the input data in respective first and second kernels.

7. The neural network system of claim 6, wherein each dimension of the first and second kernels are the same.

8. The neural network system of claim 6, wherein the first and second kernels are applicable to the input data using at least one of:
a same stride;
a same processing frequency; and
a same processing resolution.

9. The neural network system of claim 6, wherein the first and second kernels are associated with a same activation function.

10. The neural network system of claim 1, wherein the intermediate feature data comprises a feature map having first and second regions corresponding respectively to the first and second sets of weights.

11. The neural network system of claim 10, wherein the merged layer is configured to output metadata indicating the first and second regions.

12. The neural network system of claim 10, wherein the at least one subsequent layers of the first and second neural networks are configured to obtain a corresponding region of the first and second regions of the feature map.

13. The neural network system of claim 1, wherein the intermediate feature data comprises first and second feature maps, corresponding respectively to the first and second sets of weights, which are separately output from the merged layer.

14. The neural network system of claim 13, wherein the merged layer is configured to output the first and second feature maps to the at least one subsequent layers of the first and second neural networks respectively.

15. The neural network system of claim 1, wherein the neural network system comprises the prior layer of at least one of the first and second neural networks, the prior layer comprising a same layer serving both of the first and second neural networks and being configured to generate the input data for the merged layer.

16. A data processing method comprising:

receiving data in a sequential data frame form;

performing data processing in processing cycles, wherein in a given processing cycle, data processing is performed using one or more neural networks in a selected data frame; and configuring a first processing cycle and a second processing cycle by:

executing a first neural network and a second neural network of the one or more neural networks in the first processing cycle; and executing the first neural network and the second neural network of the one or more neural networks together in the second processing cycle, wherein the first and second neural networks together form a neural network system in accordance with claim 1, the first and second neural networks comprising a merged layer when executing the first and second neural networks, wherein the first neural network is executed at a first frequency as part of the first and second processing cycles, the second neural network is executed at a second frequency as part of the first and second processing cycles, and one of the first and second frequencies is a multiple of another one of the first and second frequencies.

17. The data processing method of claim 16, wherein the data in a form of sequential data frames comprises one or more of: image data; video data; and audio data.

18. A method of processing data using a processor configured to execute a neural network system, the method comprising:

receiving input data at a merged layer, shared between a first neural network and a second neural network of the neural network system, from a prior layer of at least one of the first and second neural networks, wherein the first neural network comprises at least one subsequent layer in the first neural network and wherein the second neural network comprises at least one subsequent layer in the second neural network, wherein the merged layer precedes the at least one subsequent layer of the first neural network and the at least one subsequent layer of the second neural network, and wherein the at least one subsequent layer of the first neural network is separate from the at least one subsequent layer of the second neural network;

applying a superset of weights to the input data to generate intermediate feature data representative of at least one feature of the input data, the superset of weights being combined from a first set of weights associated with the first neural network and a second set of weights associated with the second neural network; and outputting the intermediate feature data to the at least one subsequent layer of the first neural network and to the at least one subsequent layer of the second neural network.

19. The method of claim 18, comprising:
merging a first layer serving the first neural network and a second layer serving the second neural network to form the merged layer; and
replacing the first and second layers with the merged layer shared between the first and second neural networks, wherein the merging comprises combining the first and second sets of weights, stored in storage accessible to the processor, to form the superset of weights.

20. A processor for executing a neural network system, the processor configured to:
receive, for a merged layer, input data, a first set of weights associated with a first neural network and a second set of weights associated with a second neural network, wherein the first neural network comprises at least one subsequent layer in the first neural network and wherein the second neural network comprises at least one subsequent layer in the second neural network, wherein the merged layer precedes the at least one subsequent layer of the first neural network and the at least one subsequent layer of the second neural network, and wherein the at least one subsequent layer of the first neural network is separate from the at least one subsequent layer of the second neural network;
apply a superset of weights to the input data to generate intermediate feature data for the merged layer, the intermediate feature data representative of at least one feature of the input data, the superset of weights being combined from the first set of weights associated with the first neural network and the second set of weights associated with the second neural network; and
output the intermediate feature data to the at least one subsequent layer of the first neural network and to the at least one subsequent layer of the second neural network.

\* \* \* \* \*